Figure 3:
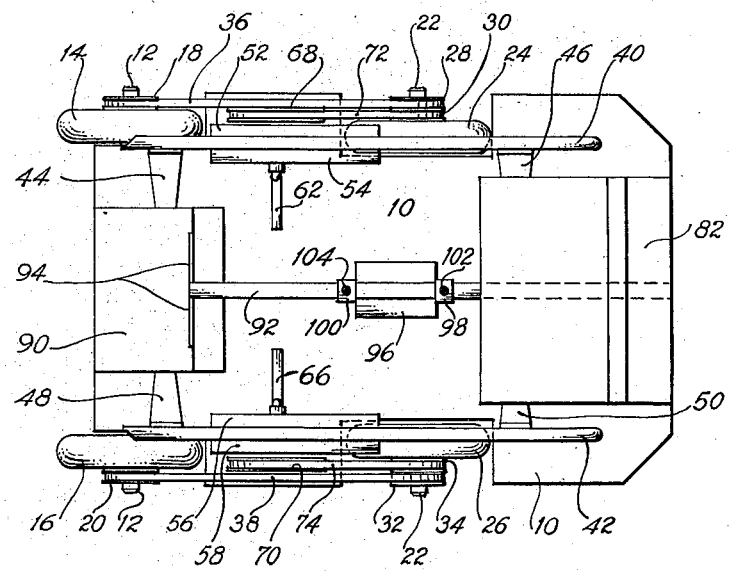

Feb. 24, 1948.                P. E. SWINDELL                 2,436,619
                                 ARMCYCLE
                        Filed Dec. 20, 1945          2 Sheets-Sheet 1
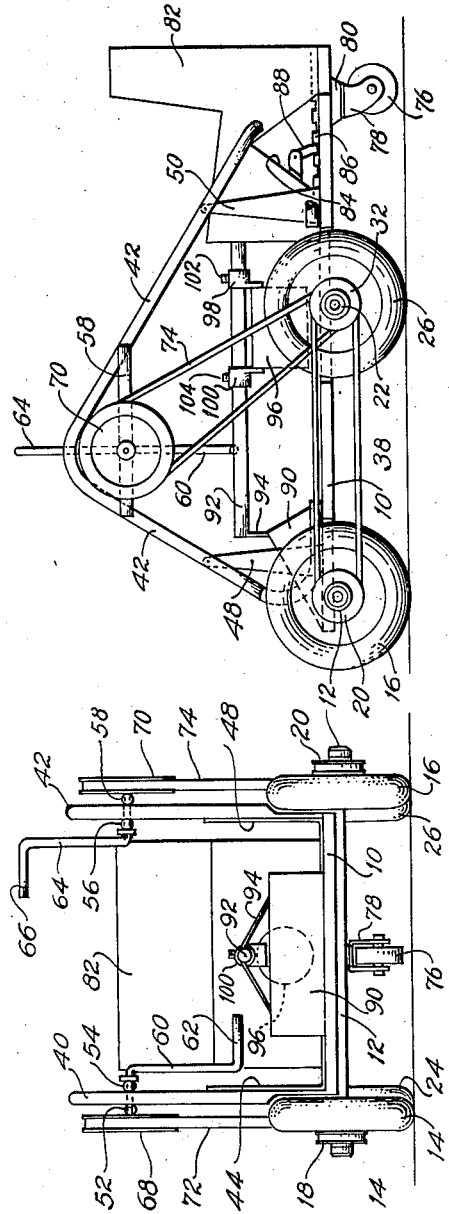
Paul E. Swindell   Inventor
By Edwin C. Woodhouse
                        Attorney Feb. 24, 1948.    P. E. SWINDELL    2,436,619
ARMCYCLE
Filed Dec. 20, 1945    2 Sheets-Sheet 2

Paul E. Swindell    Inventor

By Edwin C. Woodhouse
Attorney

Patented Feb. 24, 1948

2,436,619

UNITED STATES PATENT OFFICE 2,436,619

ARMCYCLE

Paul E. Swindell, Nashville, Tenn.

Application December 20, 1945, Serial No. 636,209

9 Claims. (Cl. 280—208)

1

This invention relates to vehicles operated by the hands and arms through crank operated driving means, herein described as armcycles.

It is an object of the present invention to provide a manually operated vehicle which is interesting to operate and, at the same time, develops the arm and shoulder muscles of the operator. It is a particular object to provide a manually operable vehicle adapted for use as a child's toy but which may also be used by adults when made of appropriate size. It is a further object to provide a manually operable vehicle which may be steered and caused to turn in arcs of different radii by a variety of modes of operation. A further particular object is to provide a manually operated vehicle which is rugged in construction, versatile in maneuverability and fascinating to operate. A still further object is to provide a novel vehicle. Other objects are to advance the art.

The above and other objects may be accomplished in accordance with my invention, which comprises a vehicle driven by hand operable cranks and which normally rides in a horizontal position on from three to four wheels but which may be tilted so as to ride on some of the wheels and a rear fifth wheel. Usually, the vehicle will comprise a horizontal platform, two independently rotatable front wheels mounted on opposite sides of the platform at the front end thereof, two independently rotatable rear wheels mounted on opposite sides of the platform slightly to the rear of the center of the platform, a side frame member on each side of the platform extending a substantial distance above the platform, a hand operated crank rotatably mounted in each side frame member a substantial distance above the platform intermediate the axes of the front and rear wheels, driving means connecting each crank with the rear wheel mounted on the same side of the platform for driving the rear wheel by rotation of the crank, a freely rotating caster wheel positioned under the rear end of the platform at the middle thereof and mounted so as to be suspended a short distance above the ground when the vehicle rests on the other four wheels, a seat on the platform positioned slightly to the rear of the axis of the rear wheels, and means for adjusting the center of gravity of the vehicle longitudinally so that, when the vehicle is occupied by the operator in normal operating position, the center of gravity of the occupied vehicle is slightly forward of the axis of the rear wheels and shifts to the rear of such axis when the operator shifts his weight backward.

My invention will be best understood from a

2 consideration of a preferred embodiment thereof, illustrated somewhat diagrammatically in the accompanying drawings, in which:

Fig. 1 is a side view of the vehicle;
Fig. 2 is a front view; and
Fig. 3 is a top plan view.

In the drawings, the vehicle comprises a platform 10 supported on wheels 14, 16, 24 and 26. The front wheels 14 and 16 are independently rotatable on the stationary axle 12 fastened to the under surface of the platform near the front end. The wheel 14 is provided on its outer face with a pulley 18, connected so that the wheel turns with the pulley. Wheel 16 is similarly provided with a pulley 20. Rear wheels 24 and 26 are mounted for independent rotation on opposite ends of the stationary rear axle 22. The axle 22 is positioned slightly to the rear of the center of the platform so that the center of gravity of the vehicle will be slightly forward of the rear axle.

Fastened to the outer face of the wheel 24, so as to be rotatable therewith, are an outer pulley 28 and an inner pulley 30. Wheel 26 is similarly provided with an outer pulley 32 and an inner pulley 34. Pulleys 18, 20, 28, 30, 32 and 34 are of the same diameter. Wheels 24 and 26 are slightly closer together than wheels 14 and 16 so that the pulleys 28 and 32 are, respectively, in the same vertical plane as pulleys 18 and 20. Pulleys 18 and 28 are connected by a belt 36 for driving the front wheel 14 from the rear wheel 24. Pulleys 20 and 32 are connected by a belt 38 for driving the front wheel from the rear wheel.

Side frames 40 and 42, which extend a substantial distance above the platform, are provided on opposite sides of the platform and are spaced apart to provide room for the feet and legs of the operator. Side frame 40 is fastened to the platform by braces 44 and 46. Side frame 42 is fastened to the platform by braces 48 and 50. Extending horizontally across the frame 40 near the top thereof are two horizontal tubes 52 and 54 which provide a bearing for a crank 60 bent to form a handle as at 62. A pulley 68 is fastened to the outer end of the crank 60 in the vertical plane of the inner pulley 30. The pulley 68 is operatively connected with pulley 30 by a belt 72. Side frame 42 is similarly provided with bearing tubes 56 and 58, forming a bearing for crank 64 bent to form a hand-grip as at 66. The crank 64 is provided at its outer end with a pulley 70 in the vertical plane of inner pulley 34 and operatively connected thereto by a belt 74. The ratio of the radii of the driving pulleys 68 and 70 to the radii of the driven pulleys 30 and 34, as shown, is 2:1, but may be larger or smaller, as desired. The cranks 60 and 64 are positioned intermediate the axes of the front and rear wheels so that the operator will be sitting upright or leaning slightly forward in the normal operation of the vehicle. The cranks will be positioned above the platform by a distance depending upon the size of the operator for which the vehicle is designed.

The vehicle is provided with a fifth wheel in the form of a caster wheel mounted at the rear end of the platform in the middle thereof so as to be suspended a slight distance above the ground, usually from about ½ inch to one inch, when the vehicle rests on the other four wheels. The caster wheel comprises a wheel 76 mounted in a swivel frame 78 having a vertical spindle rotatably mounted in the base 80 in a well known manner.

A seat 82 is mounted on the rear end of the platform and is preferably cut away, as at 84, to reduce the weight. This seat 82 is adjustable longitudinally of the vehicle so as to accommodate operators of different sizes and so as to enable adjustment of the center of gravity of the vehicle. Any suitable means may be provided for adjusting the seat. In the drawings, racks 86 and pawls 88 are shown for illustrative purposes.

A foot rest 90 is provided near the front end of the vehicle in the middle of the platform.

A counterbalance rod 92 extends longitudinally of the vehicle along the middle and a slight distance above the platform 10. This rod is supported at its front end by braces 94 secured to the foot rest. The rear end of the rod 92 may be slideably supported in the seat 82, as shown, or may be supported from the rear end of the platform by suitable braces (not shown). A counterbalance weight 96 is slideably supported on the rod 92 by hangers 98 and 100 and may be secured in adjusted position by set screws 102 and 104. The weight of the counterbalance weight will depend on the size and weight of the vehicle and on range of weights of the prospective operators.

In a representative vehicle, constructed for small children, the dimensions of the vehicle were substantially as follows: The platform was 36 inches long by 24 inches wide. The wheels 14, 16, 24 and 26 were 10 inches in diameter. The pulleys 18, 20, 28, 30, 32 and 34 were 3 inches in diameter, and the pulleys 68 and 70 were 6 inches in diameter. The vehicle was 22 inches in height with the cranks mounted 13 inches above the platform. The crank had a radius of 7 inches. The axle 12 was about 2 inches from the front end of the platform and the rear axle 22 was 18 inches from the front axle or about 20 inches from the front end of the vehicle. The cranks were positioned in a vertical plane equidistant from the front and rear axles. The vehicle may be made in larger or smaller sizes, as desired, depending upon the size of the prospective operator. By having the seat adjustable, each size vehicle can be adapted to the use of operators of different sizes, within a limited range.

In operation, the seat will preferably be adjusted to suit the size of the operator, and the counterbalance weight will be adjusted so that the center of gravity of the occupied vehicle, with the operator in the normal operating position, is slightly forward of the rear axle. The operator, by turning both cranks in the same direction at the same speed, can cause the vehicle to move forward or rearward, as desired. If he wishes to turn the vehicle, he may turn one crank at a more rapid rate than the other or hold one crank stationary while turning the other. By this operation, the vehicle can be caused to turn in a radius of about 5 feet or more. The operator, by shifting his weight rearward as by leaning back, can shift the center of gravity of the occupied vehicle to the rear of the rear axle, whereby the platform is tilted backwardly so that the front wheels are lifted off the ground and the vehicle rests upon the caster wheel and the rear wheels. The vehicle can be driven forward or rearward in this position. Also, in the tilted position, the vehicle may be turned in an arc of any desired radius by differential turning of the cranks, and may be caused to spin in a small space, substantially equivalent to the length of the vehicle, by turning the cranks in opposite directions.

The various parts of the vehicle may be made of steel, aluminum, wood or other structural material having suitable strength and rigidity. Preferably, the platform, frames, wheels, pulleys, cranks, counterbalance rod, footrest, braces, axles and the like will be made of steel. The belt will usually be of leather.

Many changes may be made in the details of construction without departing from the spirit and scope of my invention. For example, the driving connection from the cranks may be to the front wheels which will then drive the rear wheels. Also, the belt 72 may pass around pulleys 18, 28 and 68 and belt 74 may pass around pulleys 20, 32 and 70, so as to simultaneously drive the front and rear wheels directly from the cranks, thereby eliminating one belt and pulley on each side of the vehicle. The driving connection from the cranks to the wheels and from wheel to wheel may be by chains and sprockets or by gears or other suitable means.

While the front and rear wheels are preferably connected for driving one from the other to obtain better traction and maneuverability, particularly over irregular surfaces, such driving connections may be omitted so that only the rear wheels are driven and each of the front wheels is freely rotatable independently of the other wheels. In such case, the front wheels may be spaced further apart or closer together or may be replaced by a single front wheel placed at the middle of the front end of the platform.

The counterbalance rod and weight may be omitted and the center of gravity of the occupied vehicle adjusted solely by adjustment of position of the seat. The seat may be made stationary and adjustment of the center of gravity obtained solely by adjustment of the counterbalance weight. The most accurate adjustment of the center of gravity is obtained by the use of the counterbalance weight, particularly in conjunction with adjustment of the seat.

The cranks may be provided with rotatable hand grips. The term "crank" is used in its generic sense to include its mechanical equivalents and may take the form of a handwheel or the like, operating on the same principles.

While the frames 40 and 42 are shown as open and tubular, they may be otherwise formed, as, for example, substantially solid walls, etc. With the tubular frames, it will generally be desirable to have side walls inside the frames to protect the operator from contact with the driving connections, pulleys, wheels, etc.

The vehicle may be provided with a body built around it to take any desired design or shape, such as tanks, automobiles, tractors, fire trucks, locomotives, ships, aeroplanes, etc.

The wheels may be provided with rubber tires. The seat may be padded and may take various forms. The revolving parts may be provided with ball or roller bearings or bearings of other designs. The means for adjusting the seat and for supporting and adjusting the counterbalance weight may be substituted by other equivalent means.

The vehicle is under positive control of the operator at all times and its motion may be stopped by stopping the motion of the cranks. Braking may be effected by the application of the driver's feet against the front wheels. A foot brake may be provided, if desired.

Many other variations and modifications may be made in structure of the vehicle and will be apparent to those skilled in the art. Accordingly, my invention is not to be limited to the specific features shown or described, except as defined in the following claims.

I claim:

1. A manually operated vehicle comprising a horizontal platform, a freely rotatable front wheel mounted at the front end of the platform, two independently rotatable rear wheels mounted on opposite sides of the platform slightly to the rear of the center of the platform, right hand and left hand operated cranks rotatably mounted a substantial distance above the platform intermediate the axes of the front and rear wheels, driving means connecting each crank with a separate rear wheel for driving such rear wheel by rotation of the crank, a freely rotating caster wheel positioned under the rear end of the platform at the middle thereof and mounted so as to be suspended a short distance above the ground when the vehicle rests on the front and rear wheels, a seat on the platform positioned slightly to the rear of the axis of the rear wheels, and means for adjusting the center of gravity of the vehicle longitudinally so that when the vehicle is occupied by the operator in normal operating position the center of gravity of the occupied vehicle is slightly forward of the axis of the rear wheels and shifts to the rear of such axis when the operator shifts his weight backward.

2. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, a side frame member on each side of the platform extending a substantial distance above the platform, a hand operated crank rotatably mounted in each side frame member a substantial distance above the platform intermediate the axes of the front and rear wheels, driving means connecting each crank with the rear wheel mounted on the same side of the platform for driving the rear wheel by rotation of the crank, a freely rotating caster wheel positioned under the rear end of the platform at the middle thereof and mounted so as to be suspended a short distance above the ground when the vehicle rests on the other four wheels, a seat on the platform positioned slightly to the rear of the axis of the rear wheels, and means for adjusting the center of gravity of the vehicle longitudinally so that when the vehicle is occupied by the operator in normal operating position the center of gravity of the occupied vehicle is slightly forward of the axis of the rear wheels and shifts to the rear of such axis when the operator shifts his weight backward.

3. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, driving means connecting each rear wheel with a front wheel on the same side of the platform for driving one wheel from the other, a side frame member on each side of the platform extending a substantial distance above the platform, a hand operated crank rotatably mounted in each side frame member a substantial distance above the platform intermediate the axes of the front and rear wheels, driving means connecting each crank with a wheel mounted on the same side of the platform for driving the wheel by rotation of the crank, a freely rotating caster wheel positioned under the rear end of the platform at the middle thereof and mounted so as to be suspended a short distance above the ground when the vehicle rests on the other four wheels, a seat on the platform positioned slightly to the rear of the axis of the rear wheels, and means for adjusting the center of gravity of the vehicle longitudinally so that when the vehicle is occupied by the operator in normal operating position the center of gravity of the occupied vehicle is slightly forward of the axis of the rear wheels and shifts to the rear of such axis when the operator shifts his weight backward.

4. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, driving means connecting each front wheel with a rear wheel on the same side of the platform for driving the front wheel from the rear wheel, a side frame member on each side of the platform extending a substantial distance above the platform, a hand operated crank rotatably mounted in each side frame member a substantial distance above the platform intermediate the axes of the front and rear wheels, driving means connecting each crank with the rear wheel mounted on the same side of the platform for driving the rear wheel by rotation of the crank, a freely rotating caster wheel positioned under the rear end of the platform at the middle thereof and mounted so as to be suspended a short distance above the ground when the vehicle rests on the other four wheels, a seat on the platform positioned slightly to the rear of the axis of the rear wheels, and means for adjusting the center of gravity of the vehicle longitudinally so that when the vehicle is occupied by the operator in normal operating position the center of gravity of the occupied vehicle is slightly forward of the axis of the rear wheels and shifts to the rear of such axis when the operator shifts his weight backward.

5. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, a side frame member on each side of the platform extending a substantial distance above the platform, a hand operated crank rotatably mounted in each side frame member a substantial distance above the platform intermediate the axes of the front and rear wheels, driving means connecting each crank with the rear wheel mounted on the same side of the platform for driving the rear wheel by rotation of the crank, a freely rotating caster wheel positioned under the rear end of the platform at the middle thereof and mounted so as to be suspended a short distance above the ground when the vehicle rests on the other four wheels, a seat on the platform positioned slightly to the rear of the axis of the rear wheels, and means for adjusting the center of gravity of the vehicle longitudinally so that when the vehicle is occupied by the operator in normal operating position the center of gravity of the occupied vehicle is slightly forward of the axis of the rear wheels and shifts to the rear of such axis when the operator shifts his weight backward, said last named means including means for adjusting the position of the seat longitudinally of the platform.

6. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, a side frame member on each side of the platform extending a substantial distance above the platform, a hand operated crank rotatably mounted in each side frame member a substantial distance above the platform intermediate the axes of the front and rear wheels, driving means connecting each crank with the rear wheel mounted on the same side of the platform for driving the rear wheel by rotation of the crank, a freely rotating caster wheel positioned under the rear end of the platform at the middle thereof and mounted so as to be suspended a short distance above the ground when the vehicle rests on the other four wheels, a seat on the platform positioned slightly to the rear of the axis of the rear wheels, and means for adjusting the center of gravity of the vehicle longitudinally so that when the vehicle is occupied by the operator in normal operating position the center of gravity of the occupied vehicle is slightly forward of the axis of the rear wheels and shifts to the rear of such axis when the operator shifts his weight backward, said last named means including a counterbalance weight positioned between the seat and the front end of the platform and adjustable longitudinally of the platform.

7. A manually operated vehicle comprising a horizontal platform, a stationary front axle extending transversely of the platform near the front end thereof, independently rotatable wheels mounted on opposite ends of the front axle, a stationary rear axle extending transversely of the platform slightly to the rear of the center of the platform, independently rotatable wheels mounted on opposite ends of the rear axle, belt and pulley driving means connecting each front wheel with the rear wheel mounted on the same side of the platform for driving the front wheel from the rear wheel, a side frame member on each side of the platform extending a substantial distance above the platform, a hand operated crank mounted in each side frame a substantial distance above the platform intermediate the front and rear wheels, belt and pulley driving means connecting each crank with the rear wheel on the same side of the platform for driving the rear wheel from the crank, a freely rotating caster wheel positioned under the rear end of the platform at the middle thereof and mounted so as to be suspended a short distance above the ground when the vehicle rests on the four driven wheels, a seat on the platform positioned slightly to the rear of the rear axle, and means for adjusting the center of gravity of the vehicle longitudinally so that when the vehicle is occupied by the operator in normal operating position the center of gravity of the occupied vehicle is slightly forward of the rear axle and shifts to the rear of the rear axle when the operator leans backward.

8. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, a side frame member on each side of the platform extending a substantial distance above the platform, a hand operated crank mounted in each side frame a substantial distance above the platform intermediate the axes of the front and rear wheels, driving means connecting each crank with the rear wheel on the same side of the platform for driving the rear wheel from the crank, a freely rotating caster wheel positioned under the rear end of the platform at the middle thereof and mounted so as to be suspended a short distance above the ground when the vehicle rests on the other four wheels, a longitudinally adjustable seat on the platform positioned slightly to the rear of the axis of the rear wheels, and a longitudinally adjustable counterbalance weight positioned between the seat and the front end of the platform.

9. A manually operated vehicle comprising a horizontal platform, two independently rotatable front wheels mounted on opposite sides of the platform at the front end thereof, two independently rotatable rear wheels mounted on opposite sides of the platform slightly to the rear of the center of the platform, driving means connecting each front wheel with the rear wheel mounted on the same side of the platform for driving the front wheel from the rear wheel, a side frame member on each side of the platform extending a substantial distance above the platform, a hand operated crank mounted in each side frame a substantial distance above the platform intermediate the front and rear wheels, driving means connecting each crank with the rear wheel on the same side of the platform for driving the rear wheel from the crank, a freely rotating caster wheel positioned under the rear end of the platform at the middle thereof and mounted so as to be suspended a short distance above the ground when the vehicle rests on the four driven wheels, a longitudinally adjustable seat on the platform positioned slightly to the rear of the axis of the rear wheels, and a longitudinally adjustable counterbalance weight positioned between the seat and the front end of the platform.

PAUL E. SWINDELL.

REFERENCES CITED

The following references are of record in the file of this patent:

UNITED STATES PATENTS

| Number | Name | Date |
|---|---|---|
| 130,712 | Griffiths | Aug. 20, 1872 |
| 295,150 | Crowley | Mar. 18, 1884 |
| 319,682 | Dickey | June 9, 1885 |
| 1,379,107 | Kroyer | May 24, 1921 |